United States Patent
Loken et al.

(10) Patent No.: US 11,320,385 B2
(45) Date of Patent: May 3, 2022

(54) INTELLIGENT DEFECT IDENTIFICATION SYSTEM

(71) Applicant: Seagate Technology LLC, Cupertino, CA (US)

(72) Inventors: Kurtis Dean Loken, Bloomington, MN (US); Zhiyu Chen, Eagan, MN (US); Gary Kunkel, Minneapolis, MN (US)

(73) Assignee: Seagate Technology LLC

( * ) Notice: Subject to any disclaimer, the term of this patent is extended or adjusted under 35 U.S.C. 154(b) by 32 days.

(21) Appl. No.: 16/161,387

(22) Filed: Oct. 16, 2018

(65) Prior Publication Data

US 2020/0116650 A1    Apr. 16, 2020

(51) Int. Cl.
G06K 9/00 (2006.01)
G01N 21/88 (2006.01)
G06T 7/00 (2017.01)

(52) U.S. Cl.
CPC ..... *G01N 21/8851* (2013.01); *G01N 21/8803* (2013.01); *G06T 7/0006* (2013.01); *G01N 2021/8864* (2013.01); *G01N 2021/8877* (2013.01)

(58) Field of Classification Search
CPC ... G01N 2021/8924; G01N 2021/8925; G01N 2021/8927; G01N 2021/8928; G01N 21/892; G01N 21/8921; G01N 21/8922; G01N 21/894; G01N 21/896; G01N 21/898
See application file for complete search history.

(56) References Cited

U.S. PATENT DOCUMENTS

| | | | |
|---|---|---|---|
| 5,204,912 A | 4/1993 | Schimanski | |
| 5,544,256 A | 8/1996 | Brecher et al. | |
| 5,991,699 A | 11/1999 | Kulkarni et al. | |
| 6,014,461 A | 1/2000 | Hennessey et al. | |
| 6,021,220 A | 2/2000 | Anderholm | |
| 6,021,380 A | 2/2000 | Fredriksen et al. | |
| 6,072,574 A | 6/2000 | Zeimantz | |
| 6,381,098 B1* | 4/2002 | Boutaghou | G11B 5/6005 360/235.2 |
| 7,177,458 B1 | 2/2007 | Savareigo et al. | |
| 7,208,328 B2 | 4/2007 | Liao et al. | |
| 7,662,648 B2 | 2/2010 | Sandhu et al. | |
| 7,738,093 B2 | 6/2010 | Mies et al. | |
| 2004/0012775 A1* | 1/2004 | Kinney | G01N 21/9501 356/237.2 |
| 2005/0147286 A1* | 7/2005 | Lee | G06T 7/0004 382/141 |
| 2009/0060316 A1* | 3/2009 | Ruuska | B65H 26/025 382/141 |

(Continued)

*Primary Examiner* — Solomon G Bezuayehu
(74) *Attorney, Agent, or Firm* — Hall Estill Law Firm

(57) ABSTRACT

Various defects in an electronic assembly can be intelligently identified with a system having at least a server connected to a first capture module and a second capture module. The first capture module may be positioned proximal a first manufacturing line while the second capture module is positioned proximal a second manufacturing line. Images can be collected of first and second electronic assemblies by respective first and second capture modules prior to the images being sent to a classification module of the server where at least one defect is automatically detected in each of the first and second electronic assemblies concurrently with the classification module.

20 Claims, 4 Drawing Sheets

(56) References Cited

U.S. PATENT DOCUMENTS

| | | | |
|---|---|---|---|
| 2009/0281753 A1* | 11/2009 | Noy | G01N 21/95 |
| | | | 702/81 |
| 2011/0274342 A1* | 11/2011 | Maeda | H01L 22/12 |
| | | | 382/149 |
| 2012/0113276 A1* | 5/2012 | Van Arendonk | H04N 5/23238 |
| | | | 348/207.99 |
| 2014/0165729 A1* | 6/2014 | Ji | G01N 29/4481 |
| | | | 73/587 |
| 2014/0329339 A1* | 11/2014 | Chaji | G01R 31/26 |
| | | | 438/10 |
| 2015/0338378 A1* | 11/2015 | Lu | E21B 47/107 |
| | | | 73/632 |
| 2016/0293203 A1* | 10/2016 | Zhang | G01N 25/72 |
| 2017/0102678 A1* | 4/2017 | Nixon | G05B 17/02 |
| 2018/0176549 A1* | 6/2018 | Chang | G01N 21/9515 |
| 2018/0300865 A1* | 10/2018 | Weiss | G06T 7/10 |
| 2018/0372592 A1* | 12/2018 | Held | G01M 17/027 |
| 2019/0164276 A1* | 5/2019 | Huotilainen | G01N 21/89 |
| 2020/0096862 A1* | 3/2020 | Tolani | G01N 21/33 |
| 2020/0143558 A1* | 5/2020 | Tran | A43B 17/00 |

\* cited by examiner

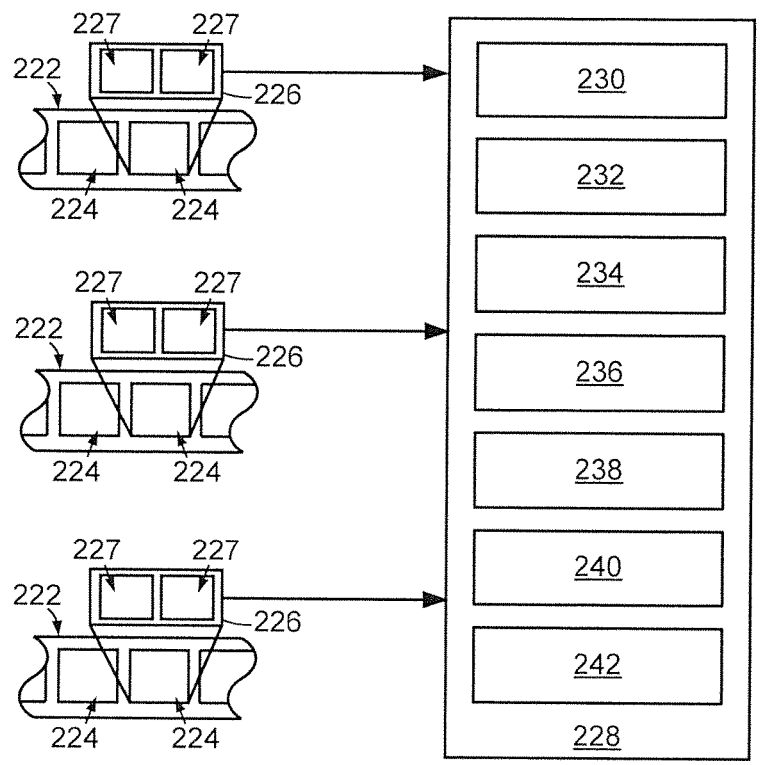
FIG. 6
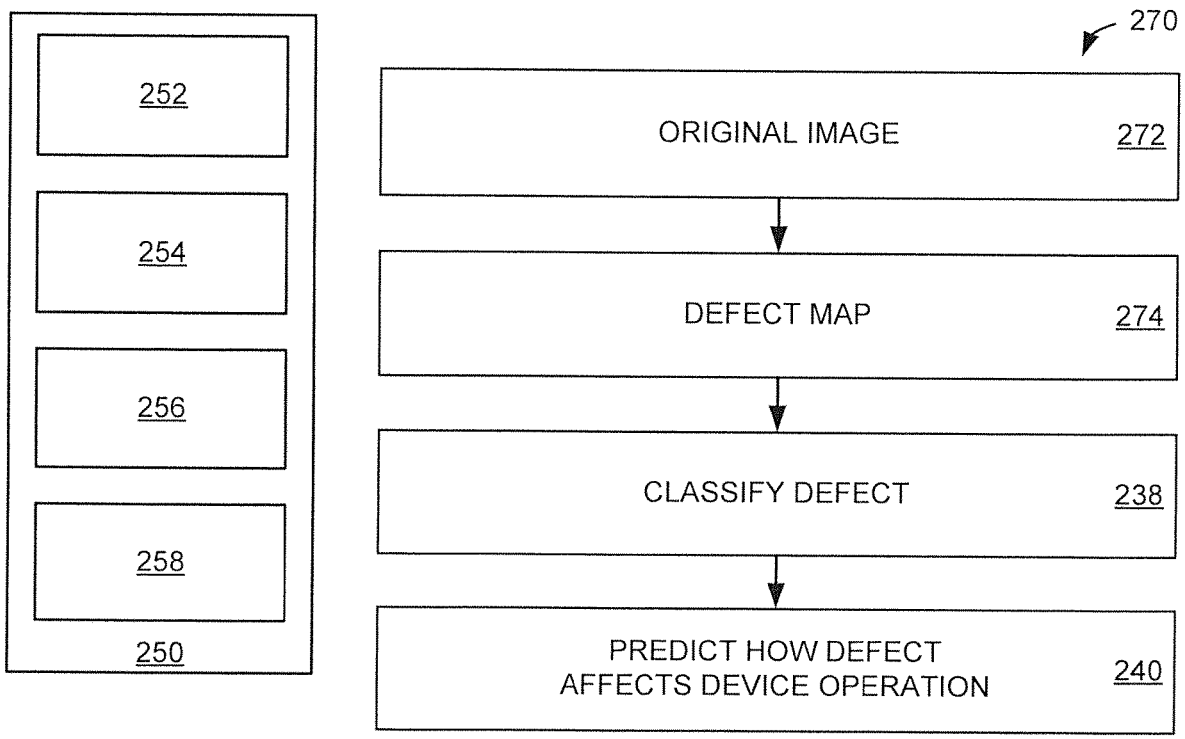
FIG. 7
FIG. 8

INTELLIGENT DEFECT IDENTIFICATION SYSTEM

SUMMARY OF THE INVENTION

In accordance with some embodiments, an intelligent defect identification system can have a server connected to a first capture module and a second capture module with the first capture module positioned proximal a first manufacturing line where a first electronic assembly is located and the second capture module positioned proximal a second manufacturing line where a second electronic assembly is located. A classification module of the server is adapted to automatically detect defects in each of the first and second electronic assemblies concurrently.

Various embodiments arrange an intelligent defect identification system with a server connected to a first capture module and a second capture module. The first capture module may be positioned proximal a first manufacturing line while the second capture module is positioned proximal a second manufacturing line. Images can be collected of first and second electronic assemblies by respective first and second capture modules prior to the images being sent to a classification module of the server where at least one defect is automatically detected in each of the first and second electronic assemblies concurrently with the classification module.

In other embodiments, an intelligent defect identification system has a server connected to a first capture module and a second capture module. The first capture module may be positioned proximal a first manufacturing line while the second capture module is positioned proximal a second manufacturing line. Images can be collected of first and second electronic assemblies by respective first and second capture modules prior to the images being sent to a classification module of the server where at least one defect is automatically detected in each of the first and second electronic assemblies concurrently with the classification module. One or more performance metrics is predicted for each of the electronic assemblies with a prediction module of the server based on the at least one detected defect.

BRIEF DESCRIPTION OF THE DRAWINGS

FIG. 6 depicts portions of an example intelligent defect identification system configured and operated in accordance with various embodiments.

FIG. 7 conveys an example learning module that can be employed by the intelligent defect identification system of FIG. 6.

FIG. 8 illustrates portions of an example intelligent defect identification system utilized in accordance with assorted embodiments.

DETAILED DESCRIPTION

Various embodiments of the present disclosure are generally directed to an intelligent defect identification system that decrease fabrication time, while increasing accuracy, of electronic assemblies.

Automated inspection of complex electronic assemblies with variable topography and surface finishes is difficult with a rule-based analysis methodology. Instead, human visual analysis is commonly employed to evaluate the presence, and severity, of defects in a constructed electronic assembly. However, human involvement in defect identification is relatively slow, particularly compared to the rate at which commercial electronic component fabrication can produce assemblies to inspect.

In addition, the plethora of different types, sizes, locations, and appearances of defects can be difficult to reliably characterize via automated testing in a manner that provides the ability to accurately assess if a constructed electronic assembly can operate as intended. The sophistication of machine learning algorithms and techniques can, over time, improve the automated identification of defects, but have been confined to individual testing stations evaluating one constructed assembly at a time, which is tedious and slow. Hence, there is a continued interest in optimizing automated electronic assembly defect analysis to provide faster defect identification and evaluation with high accuracy.

Accordingly, embodiments are directed to a defect server concurrently testing a plurality of different constructed electronic assemblies with a testing module resident in the defect server to identify at least one defect and predict whether that at least one defect will inhibit operation of one of the plurality of different electronic assemblies. The testing module can employ a learning module where defect evaluation can be improved over time by utilizing machine learning techniques in combination with human oversight. By automating defect identification and characterization with a centralized defect server, numerous electronic assemblies from diverse locations can be concurrently evaluated, which can decrease overall assembly fabrication time without sacrificing accuracy.

Figure 1:
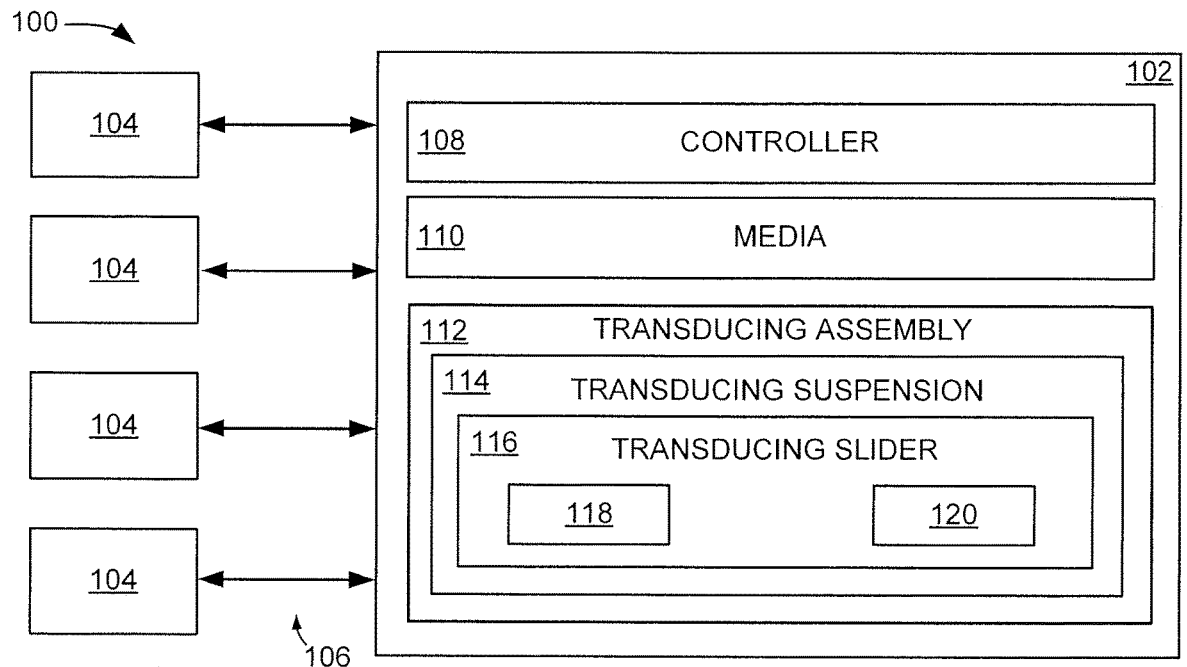
FIG. 1 provides a block representation of a portion of an example data storage system arranged in accordance with various embodiments.

FIG. 1 depicts an example data storage system 100 which utilizes one or more electronic components tested in accordance with assorted embodiments. Any number of data storage devices 102 can be employed in the data storage system 100. Those data storage devices 102 can have any capacity, data access speed, and memory type that connect to one or more remote hosts 104 via wired and/or wireless interconnections 106.

In the non-limiting example shown in FIG. 1, a data storage device 102 has a local controller 108, such as a microprocessor or programmable circuitry, that directs data access, and maintenance, operations to/from the rotating data storage media 110 via one or more transducing assemblies 112. It is noted that the rotating media 110 and transducing assemblies 112 may be replaced with solid-state memory arrays in some embodiments. A transducing assembly 112 can comprise a suspension 114 that positions a transducing slider 116 proximal predetermined locations on the media 110 to allow a data writer 118 and/or data reader 120 to program data to, and retrieve data from, the media 110.

Figure 2:
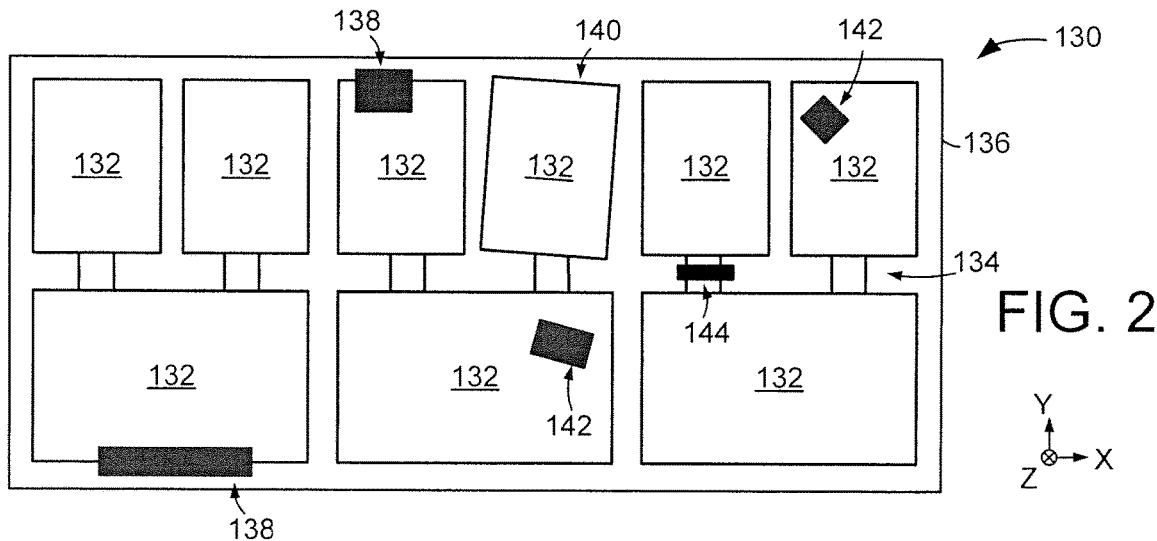
FIG. 2 represents portions of an example electronic assembly capable of being employed in the data storage system of FIG. 1.

Any portion of the data storage system 100 can be physically constructed of one or more electronic components assembled and interconnected together. FIG. 2 illustrates a line representation of an example electronic assembly 130 that can be utilized in the data storage system 100 of FIG. 1, such as the data storage device 102 or host 104. Although not required or limiting, the electronic assembly 130 is a transducing slider where separate bond pads 132 are interconnected with conductive signal pathways 134 on a common substrate 136. It is noted that the various bond pads 132 can be locations for any number of electrical components, such as a data writer 118, a data reader 120, or at least one sensor, like a differential-ended thermal coefficient of resistance sensor.

The electronic assembly 130 can experience one or more defects as a result of fabrication and/or transport during manufacturing. A defect can be characterized as any imperfection in a bond pad 132, pathway 134, substrate 136, or electronic component physically attached to a bond pad 132 that materially degrades operation of any aspect of the electronic assembly 130. For instance, a defect may be a physical imperfection that allows short-term functionality, but degrades long-term reliability. As another non-limiting example, a defect may degrade, but not stop function of one or more components attached to the assorted bond pads 132.

Although not exclusive or exhaustive, the example electronic assembly 130 of FIG. 2 shows how a bond pad 132 may have an incorrect, asymmetrical shape, as illustrated by region 138, that can be contributed to more, or less, bond pad 132 material being present. Region 140 conveys another bond pad 132 defect where a pad 132 is misaligned while having a correct, symmetrical shape. The varying topography of the electronic assembly 130 can contribute to the presence of reduced bond pad 132 thickness, as shown by regions 142, where underlying material, such as copper, is exposed. A wire bond defect, as illustrated in region 144 by a segmented signal pathway 134, can also degrade the function and/or performance of some, or all, of the electronic assembly.

Figure 3:
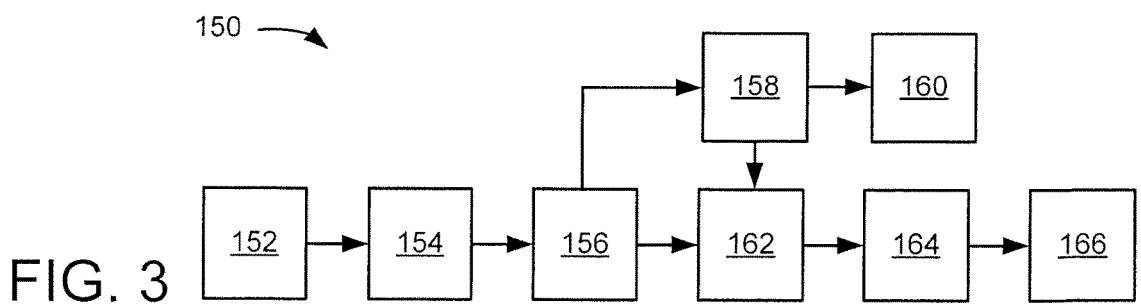
FIG. 3 shows a block representation of an example electronic assembly timeline that may be practiced in accordance with some embodiments.

Despite heightened fabrication tolerances and more sophisticated fabrication techniques, defects can inadvertently arise in electronic assemblies 130. FIG. 3 conveys an example timeline 150 of activity that can accompany manufacturing of an electronic assembly to mitigate the effect of defects in data storage devices shipped to end-users. An electronic assembly is constructed in step 152 in accordance with a predetermined layout to position electrical aspects to provide electrical functionality when incorporated into a data storage device. Step 154 then interconnects the various electrical aspects via one or more signal pathways.

It is noted that the interconnection of step 154 may be conducted in step 152. Regardless, electrical interconnection of the aspects of an electrical assembly is followed by inspection of the assembly in step 156. Inspection may be conducted visually by machine or human and may involve additional sensors, such as thermal, radar, or sonar systems. A preliminary inspection in step 156 may trigger additional inspection in step 158, which may evaluate portions of the electrical assembly redundantly and/or with heightened scrutiny. Failure of both inspections 156/158 can prompt for the discarding of the electrical assembly as inoperative junk in step 160. However, it is contemplated that the additional inspection of step 158 can identify the electronic assembly as operative, which proceeds to step 162 where the electronic assembly is packaged into a data storage device with one or more other electrical components, such as a controller.

Dual inspection steps are not always necessary and inspection in step 156 can result in the electronic assembly being deemed valid and operable before being packaged in step 162. One or more functional tests can subsequently be conducted in step 164 on the packaged data storage device. Testing may identify a defect, failure, or other performance degrading condition that triggers step 160 to discard some, or all, of a data storage device. In the event the performance of the packaged data storage device is verified in step 164, step 166 ships the data storage device to an end-user for incorporation into a computing system, such as a desktop computer, laptop, tablet, smartphone, smartwatch, cloud computing rack, mass data storage enclosure, or server.

Figure 4:
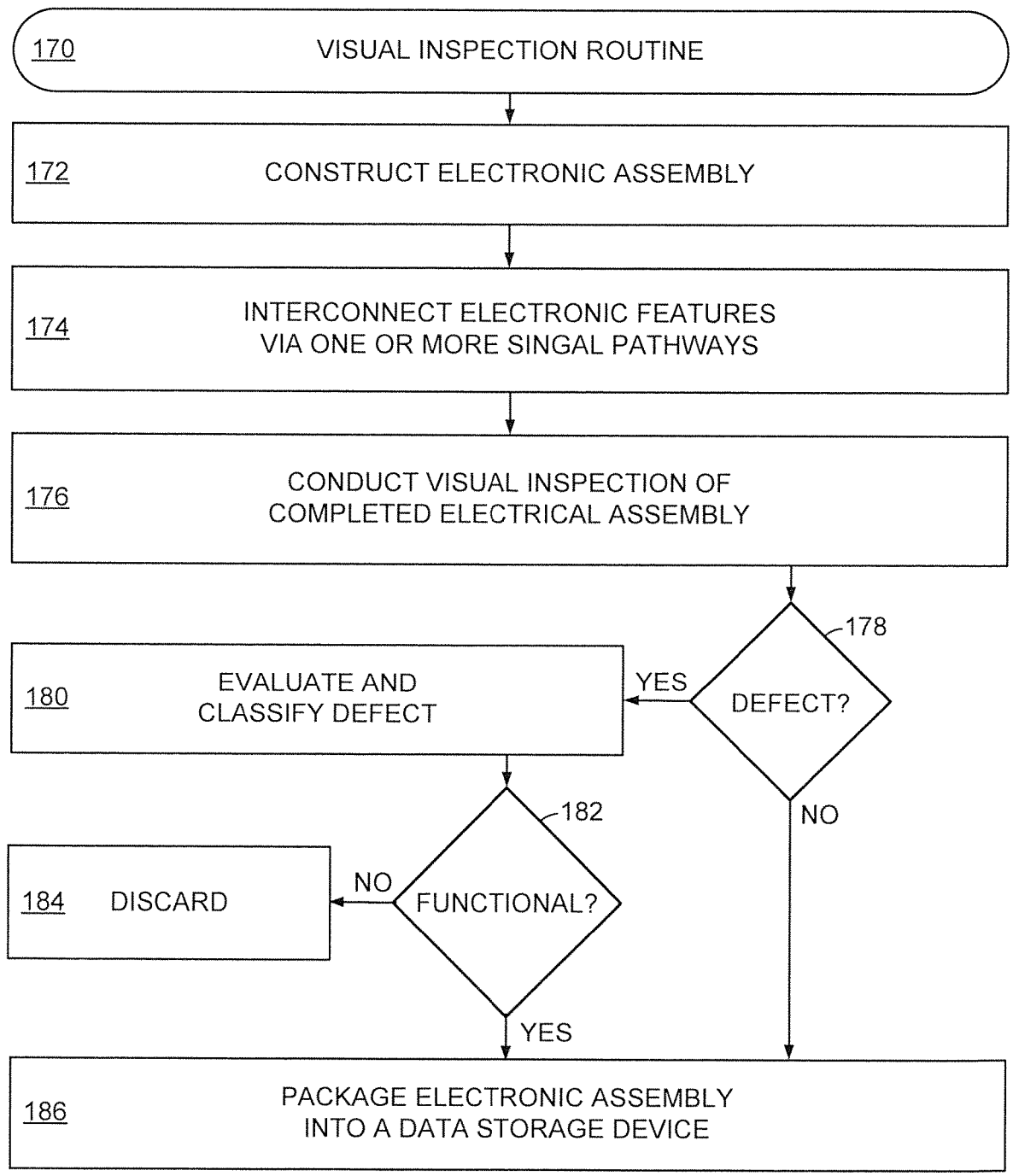
FIG. 4 displays an example visual inspection routine that may be executed with portions of the data storage system of FIG. 1.

With the inspection 156/158 and testing 164 activity, an electronic assembly can undergo a thorough analysis to ensure functionality and performance. In yet, certification of the structure and performance of an electronic assembly can be a bottleneck for the manufacturing of a data storage device. That is, visual inspection of an electronic assembly can be relatively slow, tedious, and plagued by additional handling and transportation risks. FIG. 4 is a flowchart of an example visual inspection routine 170 that can be conducted as part of the manufacturing timeline 150 of FIG. 3 in accordance with various embodiments. The routine 170 can begin with any amount of construction of an electronic assembly in step 172, such as placing electrical features on a substrate, forming electrical features on a substrate, and/or conducting lithography to fabricate electrically conductive aspects of an electrical assembly.

The electrical features constructed in step 172 are then electrically interconnected in step 174 via one or more signal pathways. It is expected that at the conclusion of step 174, an electrical assembly is structurally complete and ready to be integrated into a data storage device unless the operations of steps 172 and/or 174 resulted in one or more defects being present. Step 176 conducts a visual inspection of the completed electrical assembly to identify any defects. Such visual inspection can be conducted by a human physically engaging the electrical assembly or optically sensing the electrical assembly from a remote location. The human involvement with step 176 has been deemed critical, in the past, to accurately assess the presence and severity of defects due to rule-based automated evaluation and/or inspection algorithms have not been sophisticated enough to provide accurate defect characterization.

The inclusion of human inspection in step 176 allows decision 178 to first identify if one or more defects are present. If so, step 180 then utilizes the human inspector to evaluate each defect. Such evaluation can be to classify a defect by type, location, size, and severity. The evaluation of step 180 may further engage the human inspector to speculate as to the functionality of the electronic assembly in decision 182, but such speculation is not required as decision 182 may evaluate the functionality of the electronic assembly based on predetermined evaluation rules, such as threshold defect size and/or location. An electronic assembly with degraded functionality triggers step 184 to discard the assembly, which may involve returning to step 172 where portions of the defective electronic assembly are remanufactured.

A defect that does not detrimentally affect electronic assembly functionality or performance can cause decision 182 to proceed to step 186 where the electronic assembly is incorporated into a data storage device, such as part of step 164 of FIG. 3. Alternatively, a lack of any defects from decision 178 causes step 186 to package the electronic assembly into a data storage device. Although logically straightforward, the involvement of human inspection is detrimental to routine 170 and timeline 150 at least in terms of electronic assembly evaluation time compared to what could be achieved by implementing automated computing intelligence that has previously been unachievable.

Figure 5:
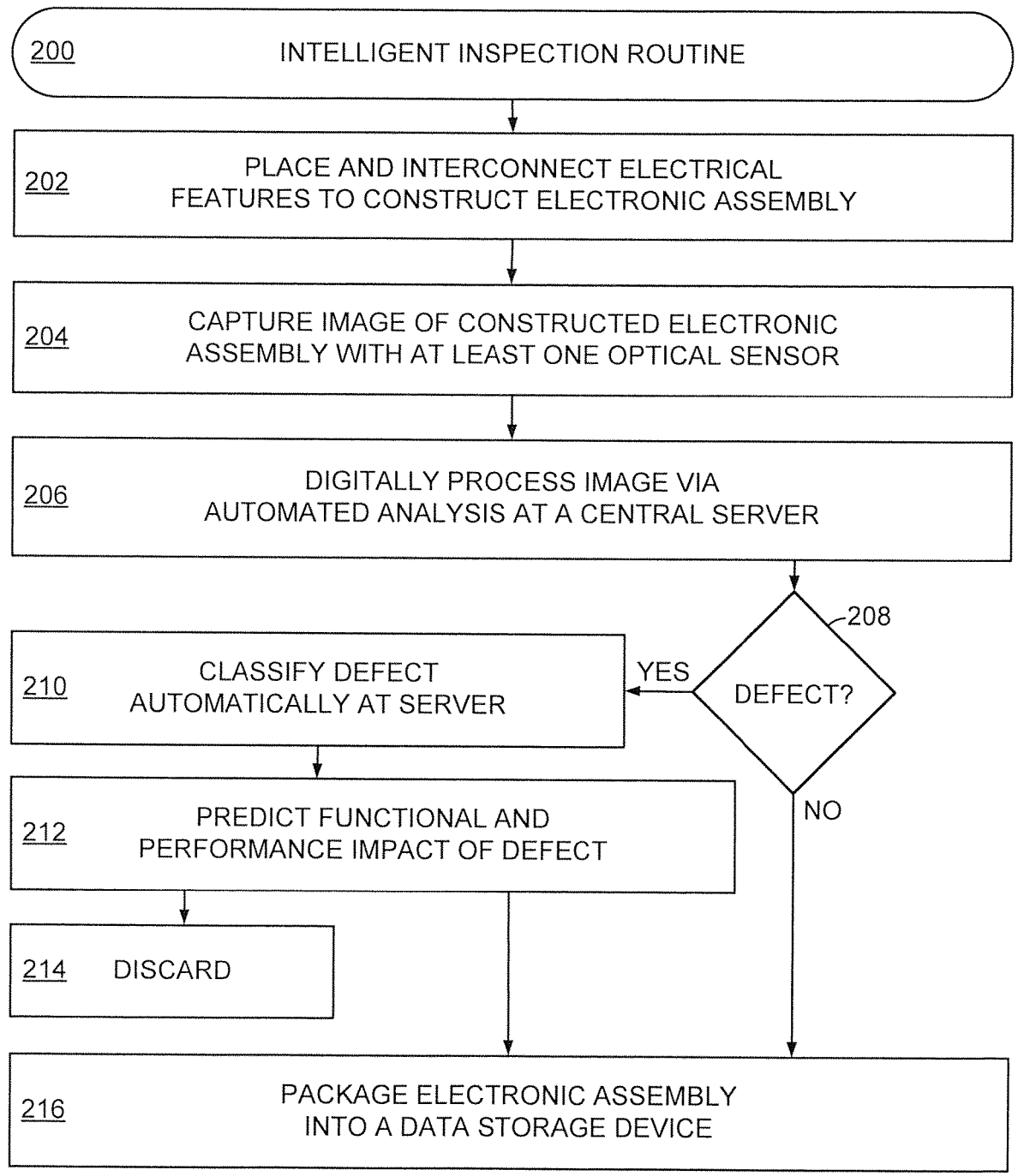
FIG. 5 is an example intelligent inspection routine that can be carried out with portions of the data storage system of FIG. 1 in some embodiments.

Accordingly, various embodiments employ a centralized computing server to concurrently evaluate multiple different electronic assemblies and characterize any discovered defects without human inclusion. The example intelligent inspection routine 200 of FIG. 5 depicts how electrical assemblies, such as data transducing sliders, can be optimally inspected as part of the manufacturing of a data storage device. Routine 200 can begin similarly to routine 170 with various electrical features placed and interconnected in one or more steps that result in step 202 submitting a structurally complete slider assembly for inspection.

Any number of sensors, such as optical lenses, optical cameras, and topographical detectors, can capture still, or moving, images in step 204 of at least some of a slider submitted in step 202. The image(s) from step 204 are transmitted to a central server via a wired and/or wireless network in step 206 where the image(s) are processed digitally via automated digital analysis as directed by at least one controller of the central server. The digital processing of step 206 is not limited to a particular analysis, but can involve generating a defect map by comparing a submitted image to an image of a non-defective slider.

The image processing of step 206 can occur concurrently for numerous different sliders being manufactured in different physical locations, such as fabrication facilities in different cities, countries, and global hemispheres. It can be appreciated that the image taking, transmitting, and processing capabilities of multiple sliders with a central server provides an inspection system optimized for time and efficiency compared to a human visually inspecting individual sliders. The digital processing of step 206 allows decision 208 to quickly determine if a defect is present in a submitted slider.

A detected defect causes step 210 to then classify the defect. Such classification is not limited to a particular defect characteristic, but in some embodiments, classifies each detected defect by size, location, color, and proximity to other defects. The classification of step 210 can be conducted simultaneously for multiple different submitted sliders due to the computing capabilities of a central server, which is significantly faster than human classification of a single slider. Classified defects allow step 212 to then predict at least the functional and performance impact of the defect on the slider.

The central server can employ a prediction module that takes the defect classifications of step 210 and determines if a slider is fit for incorporation in a data storage device. The rules to determinate if a defect is severe enough to merit step 214 discarding the slider or minimal enough to merit step 216 packaging the slider into a data storage device are maintained by the server controller and can be updated in real-time to adapt to changing tolerances, defect identifiers, defect severity, and implication of defect classifications on data storage device functionality and performance.

FIG. 6 illustrates a line representation of an example defect identification system 220 in which routine 200 can be practiced in accordance with some embodiments. Any number (N) of manufacturing lines 222 located in a common, or dissimilar, physical location can manufacture electronic assemblies 224, such as a slider, at a predetermined rate that may, or may not, utilize automated manufacturing techniques. Each manufacturing line 222 has a capture module 226 that contains at least one image capturing device, such as an optical sensor and/or camera. It is contemplated that the capture module 226 contains multiple different electronic assembly imaging sensors 227, such as radar, sonar, and acoustic sensors.

It is noted that the various capture modules 226 do not process images locally, and instead immediately sends any sensed data pertaining to a manufactured electronic assembly 224 to a single server 228. Such data transmission, as opposed to processing sensed data locally, allows the capture modules 226 to operate as maximum efficiency and accuracy while the server 228 executes sophisticated computer processing to evaluate and classify sensed data for defects. The relatively low computing requirements for the respective capture modules 226 further allow the modules 226 to be space and cost effective, such as for replacement and power usage.

The server 228 is not limited to particular computing components, but does contain at least a local controller 230 that directs the processing of sensed data from the assorted capture modules 226 individually, sequentially, or concurrently. It is noted that components can be trained, such as a graphics processing unit, to operate alone, or in combination with, the server 228. Sensed data received by the server 228 can be temporarily stored in a local memory 232 and permanently stored in a log 234 that organizes past defect identification operations, such as number of defects, average severity of identified defects, and average defect identification time. The local controller 230 can also conduct defect identification with a mapping module 236, a classification module 238, a prediction module 240, and a learning module 242. It is noted that each module 236/238/240/242 comprises programmable circuitry that may be independent, or shared, while being resident in the server 228.

The mapping module 236 may be tasked by the controller 230 to initially analyze one or more sensed electronic assembly images to create a defect map that highlights, emphasizes, and/or clarifies areas of an image where defects are indicated. The mapping module 236 can conduct one or more comparisons of a sensed image to known defects to create a defect map. It is contemplated that the mapping module 236 can additionally indicate areas of concern that do not conform to any known defect, which can catch new defects and other structural issues that can degrade electronic assembly operation.

The classification module 238 can concentrate on the areas emphasized in a defect map to determine if a defect is indeed present. The utilization of the defect map from the mapping module 236 allows the classification module 238 to more quickly and efficiently analyze areas of interest instead of analyzing the entirety of an electronic assembly image. As a result, the classification module 238 can employ multiple different image analysis algorithms to repeatedly analyze concentrated areas of an electronic assembly image that are less than the entirety of the image to identify the type, size, location, and proximity of defects present in an electronic assembly.

Classifying defects with the classification module 238 provides information used by the prediction module 240 to forecast how the defect will affect the operation and/or performance of an electronic assembly. The prediction module 240 can employ the saved defect history of the server log 234, one or more defect models, and at least one algorithm to determine if a defect, or plurality of separate defects, will inhibit data storage device operation if, and when, the electronic assembly is packaged with other data storage components, as shown in FIG. 1.

The prediction module 240 may predict certain performance metrics in response to the presence of one or more defects. For instance, the prediction module 240 can compute a predicted adjusted lifespan for the electronic assembly due to the weakened structure of the defect. As another non-limiting example, the prediction module 240 can prescribe adjusted operational parameters, such as power usage, heat production, media spinning rate, and continuous operating time, to allow the defective electronic assembly to be utilized in a data storage device instead of being discarded.

The mapping 236, classification 238, and prediction 240 modules may employ the learning module 242 to accurately identify, characterize, and predict defect criteria. The learning module 242 can provide defect identifying instructions that allow a defect to be discovered, analyzed, and characterized from one or more images. Such identifying instructions can generate particular shapes, shading, colors, and/or orientations of adjacent components to allow a defect to be efficiently identified and processed to provide accurate predicted defect performance metrics. The identifying instructions may further be used to train machine learning of the system to more accurately, and/or efficiently, identify defects.

FIG. 7 conveys a block representation of an example learning module 250 that can be employed in a server of a defect identification system in accordance with various embodiments. The learning module 250 can store a derived defect criteria 252, such as average size, color, shading, and position in an electronic assembly. The learning module 250 can also store past encountered defects 254 to allow human verification 256 at a later time. That is, the learning module 250 can improve the derived defect criteria 252 by storing defect images 254 to allow a human to visually evaluate the defect.

As a result of the human verification 256, the defect criteria 252 can be changed to evolve and allow a defect to more accurately, and quickly, be identified then classified. Through repeated adjustments to the defect criteria 252 provided to the mapping 236 and classification 238 modules, the automated identification of defects will improve in both veracity and efficiency. It is contemplated that the learning module 250 can generate a defect accuracy metric 258, such as percentage chance a defect identification, or prediction, is correct. The learning module 250 may further compute defect accuracy metrics 258 for different types of defects, such as asymmetrical shape, misalignment, and wire bond defects.

With the computing capability of a server, the learning module 250 can be concurrently utilized to process a plurality of electronic assemblies simultaneously. FIG. 8 displays portions of an example defect identification system 270 configured in accordance with some embodiments. A mapping module 236 can intake multiple different electronic assembly images 272 and produce a defect map 274 for each electronic assembly. While not limiting, the defect map 274 can utilize natural, and artificial means to emphasize portions of an image 272, such as color, zoomed in areas, and image enhancement, such as line smoothing, where defects may be present.

The emphasized elements in the defect map 274 are processed by the classification module 238 to characterize the elements as defects or anomalies. The emphasis of the defect map 274 can aid the classification module 238 in differentiating defect types and assessing the severity of a defect imperfection. Once the defects are identified and classified, the prediction module 240 can utilize the emphasized defects from the defect map 274, or the original image 272, to forecast the functionality, longevity, and performance of the defective electronic assembly. The ability to utilize the emphasized portions of the defect map 274 allows the prediction module 240 to make more accurate predictions in less time than if image 272 processing were executed by the prediction module 240.

Through the various embodiments of the present disclosure, a centralized server can concurrently evaluate a number of different electronic assemblies for defects. The automation of defect identification with a single server allows for increased defect identification accuracy and speed compared to human visual inspections. By utilizing computing capabilities to process data sensed from a constructed electronic assembly, such as a transducing slider, machine learning, sophisticated modeling, and robust algorithms can classify defects so that the performance impact of a defect can be predicted, which allows defective electronic assemblies to be utilized in a practical manner instead of being discarded due to the mere presence of a defect.

What is claimed is:

1. An apparatus comprising a server connected to a first capture module and a second capture module, the first capture module positioned with a first manufacturing line where a first electronic assembly is located and the second capture module positioned with a second manufacturing line where a second electronic assembly is located, a classification module of the server adapted to automatically detect defects in each of the first and second electronic assemblies concurrently, a prediction module of the server to prescribe at least one adjusted operational parameter to the first electronic assembly to allow the first electronic assembly to operate in a data storage device despite the presence of at least one defect that exceeds a predetermined threshold corresponding to discarding the first electronic assembly.

2. The apparatus of claim 1, wherein the classification module is directed to detect defects by a controller of the server.

3. The apparatus of claim 1, wherein each capture module comprises a camera that supplies the classification module with at least one image of the first or second electronic assemblies.

4. The apparatus of claim 1, wherein the first and second manufacturing lines are physically located in different cities.

5. The apparatus of claim 1, wherein the first capture module comprises multiple different sensors.

6. The apparatus of claim 1, wherein each electronic assembly is a transducing slider.

7. A method comprising:
connecting a server to a first capture module and a second capture module, the first capture module positioned with a first manufacturing line and the second capture module positioned with a second manufacturing line;
fabricating a first electronic assembly with the first manufacturing line;
fabricating a second electronic assembly with the second manufacturing line;
collecting a first image of the first electronic assembly with the first capture module;
collecting a second image of the second electronic assembly with the second capture module;
sending the first and second images to a classification module of the server;
detecting at least one defect automatically in each of the first and second electronic assemblies concurrently with the classification module;

determining, with the server, the at least one defect is above a predetermined threshold corresponding with discarding the first electronic assembly; and prescribing an adjusted operational parameter for the first electronic assembly with a prediction module of the server, the adjusted operational parameter allowing the first electronic assembly to operate in a data storage device despite the presence of the at least one defect that exceeds the predetermined threshold.

8. The method of claim 7, wherein a mapping module of the server creates a defect map from the first image.

9. The method of claim 8, wherein the at least one defect is detected by the classification module after assessing the defect map.

10. The method of claim 8, wherein the defect module emphasizes at least one portions of the first image where a defect may be present.

11. The method of claim 10, wherein the mapping module artificially enhances the first image to emphasize the at least one portion.

12. The method of claim 7, wherein the classification module utilizes a learning module of the server to detect the at least one defect, the learning module providing at least one defect criteria.

13. The method of claim 12, wherein the learning module generates a defect accuracy metric for each of the at least one detected defects.

14. The method of claim 12, wherein the learning module inputs a human visual inspection of logged defects to adjust the at least one defect criteria.

15. A method comprising:
connecting a server to a first capture module and a second capture module, the first capture module positioned with a first manufacturing line and the second capture module positioned with a second manufacturing line;
fabricating a first electronic assembly with the first manufacturing line;
fabricating a second electronic assembly with the second manufacturing line;
collecting a first image of the first electronic assembly with the first capture module;
collecting a second image of the second electronic assembly with the second capture module;
sending the first and second images to a classification module of the server;
detecting a first defect and a second defect automatically in the first electronic assembly and a third defect in the second electronic assembly concurrently;
predicting one or more performance metrics for each of the electronic assemblies with a prediction module of the server based on the detected defects;
determining, with the server, the second defect is above a predetermined threshold corresponding with discarding the first electronic assembly; and
deploying the first electronic assembly in a data storage device after adjusting operating parameters of the first electronic assembly in view of the second detected defect to allow operation of first electronic assembly in the data storage device with the second defect exceeding the predetermined threshold.

16. The method of claim 15, wherein the prediction module utilizes a defect map created by a mapping module of the server.

17. The method of claim 15, wherein the one or more performance metrics is a lifespan of the first or second electronic assemblies.

18. The method of claim 15, wherein the first electronic assembly and second electronic assembly are each deployed in the data storage device.

19. The method of claim 15, wherein the adjusted operating parameter is power usage.

20. The method of claim 15, wherein the adjusted operating parameter is temperature.

* * * * *